US011727637B2

(12) United States Patent
Seo et al.

(10) Patent No.: US 11,727,637 B2
(45) Date of Patent: Aug. 15, 2023

(54) METHOD FOR GENERATING 3D SKELETON USING JOINT-BASED CALIBRATION ACQUIRED FROM MULTI-VIEW CAMERA

(71) Applicant: Kwangwoon University Industry-Academic Collaboration Foundation, Seoul (KR)

(72) Inventors: Young Ho Seo, Seoul (KR); Byung Seo Park, Cheongju-si (KR)

(73) Assignee: Kwangwoon University Industry-Academic Collaboration Foundation, Seoul (KR)

( * ) Notice: Subject to any disclaimer, the term of this patent is extended or adjusted under 35 U.S.C. 154(b) by 0 days.

(21) Appl. No.: 17/535,036

(22) Filed: Nov. 24, 2021

(65) Prior Publication Data
US 2022/0189113 A1 Jun. 16, 2022

(30) Foreign Application Priority Data

Dec. 15, 2020 (KR) .......................... 10-2020-0174947
Jan. 21, 2021 (KR) .......................... 10-2021-0008979

(51) Int. Cl.
*G06T 17/20* (2006.01)
*G06T 7/80* (2017.01)
*G06T 7/55* (2017.01)

(52) U.S. Cl.
CPC ............. *G06T 17/20* (2013.01); *G06T 7/55* (2017.01); *G06T 7/80* (2017.01); *G06T 2207/30196* (2013.01)

(58) Field of Classification Search
CPC .. G06T 17/20; G06T 7/80; G06T 7/55; G06T 2207/30196
See application file for complete search history.

(56) References Cited

U.S. PATENT DOCUMENTS

2010/0303290 A1* 12/2010 Mathe .................... G06T 17/05
382/103
2012/0105585 A1* 5/2012 Masalkar ................ G06F 3/017
348/46
(Continued)

FOREIGN PATENT DOCUMENTS

KR 102152432 B1 * 3/2019 ............. G06T 15/04

OTHER PUBLICATIONS

Pavez, Eduardo et al., "Dynamic polygon clouds: representation and compression for VR/AR", APSIPA Transactions on Signal and Information Processing, 2018, vol. 7.
(Continued)

*Primary Examiner* — Terrell M Robinson
(74) *Attorney, Agent, or Firm* — NKL Law; Jae Youn Kim (57) ABSTRACT

Proposed is a three-dimensional skeleton generation method using calibration based on a joint acquired from a multiview camera, capable of extracting a partial skeleton of each viewpoint from a distributed RGB-D camera, calculating a camera parameter by using a joint of each partial skeleton as a feature point, and integrating each partial skeleton into a three-dimensional skeleton based on the parameter. The three-dimensional skeleton generation method includes: (a) acquiring a multiview color-depth video; (b) generating a three-dimensional skeleton of each viewpoint from a color-depth video of each viewpoint, and generating a joint of the skeleton of each viewpoint as a feature point; (c) performing extrinsic calibration for optimizing an extrinsic parameter by using the joint of the skeleton of each viewpoint; and (d) aligning and integrating the three-dimensional skeleton of each viewpoint by using the extrinsic parameter.

9 Claims, 8 Drawing Sheets

(56) References Cited

U.S. PATENT DOCUMENTS

| | | | | |
|---|---|---|---|---|
| 2013/0187919 A1* | 7/2013 | Medioni | ............... | G06T 17/00 345/420 |
| 2014/0072175 A1* | 3/2014 | Hasler | ................... | G06T 17/00 382/103 |
| 2019/0340803 A1* | 11/2019 | Comer | ................... | G06T 13/40 |

OTHER PUBLICATIONS

Kammerl, Julius et al., "Real-time Compression of Point Cloud Streams", 2012 IEEE International Conference on Robotics and Automation, 2012.

Desai, Kevin et al., "Skeleton-based Continuous Extrinsic Calibration of Multiple RGB-D Kinect Cameras", 2018.

Wu, Yuanjie et al., "Towards Robust 3D Skeleton Tracking Using Data Fusion from Multiple Depth Sensors", 2018.

Cao, Zhe et al., "OpenPose: Realtime Multi-Person 2D Pose Estimation using Part Affinity Fields", IEEE Transactions on Pattern Analysis and Machine Intelligence, 2019.

\* cited by examiner

```
function Skeleton-based Dynamic Extrinsic Calibration {
    input 3D coordination of joints of 8 skeletons;
    input extrinsic parameters $P_n^i$ of $R_i$ and $t_i$ ($i$ is the camera number)
    initialize all extrinsic parameters $P_n$;
    define reference camera ($i = 0$);
    function joint matching (3D coordination of joints) {
        for $i$ (1 to 7) {
            for $n$ (the number of joint downto $c$) {
                for $k$ (net error > error threshold) {
                    transform feature point of the $i^{th}$ camera by $X_i' = R_{i \to ref} X_i + t_{i \to ref}$ (1);
                    calculate error of joints by $f_{Error} = \frac{1}{N} \sum_{j=0}^{N} \| X_{ref}(j) - X_i'(j) \|_2^2$ (2);
                    differentiate the error function by $\frac{\partial f_{Error}}{\partial P_n^{i,k}}$ ;
                    update extrinsic parameters by $P_{n+1}^{i,k} = P_n^{i,k} - \alpha \frac{\partial f_{Error}}{\partial P_n^{i,k}}$ (3);
                }
                remove a joint with maximum error;
            }
            store $R_i$ and $t_i$ using extrinsic parameter $P_n^i$ of the $i^{th}$ camera;
        }
    }
}
```

METHOD FOR GENERATING 3D SKELETON USING JOINT-BASED CALIBRATION ACQUIRED FROM MULTI-VIEW CAMERA

CROSS-REFERENCE TO RELATED APPLICATIONS

This application claims priority to and the benefit of Korean Patent of Application No. 10-2020-0174947, filed on Dec. 15, 2020 and Korean Patent of Application No. 10-2021-0008979, filed on Jan. 21, 2021, the disclosures of which are incorporated herein by reference in their entireties.

BACKGROUND OF THE INVENTION

1. Field of the Invention

The present invention relates to a three-dimensional skeleton generation method using calibration based on a joint acquired from a multiview camera, capable of extracting a partial skeleton of each viewpoint from a distributed RGB-D camera, calculating a camera parameter by using a joint of each partial skeleton as a feature point, and integrating each partial skeleton into a three-dimensional skeleton based on the parameter.

In addition, the present invention relates to a three-dimensional skeleton generation method using calibration based on a joint acquired from a multiview camera, capable of generating an integrated three-dimensional skeleton by generating a three-dimensional mesh from a camera parameter and a color-depth video, aligning each partial skeleton by using the camera parameter, and refining each partial skeleton with the three-dimensional mesh.

2. Description of the Related Art

Recently, as virtual reality (VR) and augmented reality (AR) industries become active, three-dimensional (3D) video content techniques that provide realistic experiences from various viewpoints are also being actively developed. The 3D video content is applied to various application fields such as a game field, an image service, a medical field, an education field, and the like.

In order to generate such a three-dimensional content, a three-dimensional object may be modeled into a 3D volumetric mesh model, and rigging or animating may be performed based on the 3D volumetric mesh model. However, for this application, a method of acquiring a precise 3D skeleton is required.

Until now, many researches for extracting a skeleton have been conducted. Many signal processing techniques for extracting a skeleton have been researched, and recently, many techniques based on deep learning have been researched.

A conventional method of extracting a skeleton is to attach various devices such as a sensor to a person. Although a movement may be precisely recognized in real time, a high cost is required, and the person does not always wear the device in real life, so that the above method is possible only in a laboratory or a limited area.

Therefore, a human body posture estimation research has been conducted to estimate a posture from a photograph without any device attached to a body. In order to estimate the posture, a feature such as a profile of a human body or an outline from which a specific body portion is inferred has to be extracted from the photograph. However, a degree of precision thereof is not yet high.

DOCUMENTS OF RELATED ART

Non-Patent Documents (Non-patent document 1) Kevin Desai, Balakrishnan Prabhakaran, and Suraj Raghuraman. 2018. "Skeleton-based continuous extrinsic calibration of multiple RGB-D kinect cameras." 2018 Proceedings of the 9th ACM Multimedia Systems Conference. Association for Computing Machinery, New York, N.Y., USA, 250?257. DOI:https://doi.org/10.1145/3204949.3204969

(Non-patent document 2) Y. Wu, L. Gao, S. Hoermann and R. W. Lindeman, "Towards Robust 3D Skeleton Tracking Using Data Fusion from Multiple Depth Sensors." 2018 10th International Conference on Virtual Worlds and Games for Serious Applications (VS-Games), Wurzburg, 2018, pp. 1-4, doi: 10.1109VS-Games.2018.8493443.

(Non-patent document 3) Cao, Zhe, et al. "OpenPose: realtime multi-person 2D pose estimation using Part Affinity Fields." arMv preprint arXiv:1812.08008 (2018).

SUMMARY OF THE INVENTION

To solve the problems described above, an object of the present invention is to provide a three-dimensional skeleton generation method using calibration based on a joint acquired from a multiview camera, capable of extracting a partial skeleton of each viewpoint from a distributed RGB-D camera, calculating a camera parameter by using a joint of each partial skeleton as a feature point, and integrating each partial skeleton into a three-dimensional skeleton based on the parameter.

In addition, an object of the present invention is to provide a three-dimensional skeleton generation method using calibration based on a joint acquired from a multiview camera, capable of generating an integrated three-dimensional skeleton by generating a three-dimensional mesh from a camera parameter and a color-depth video, aligning each partial skeleton by using the camera parameter, and refining each partial skeleton with the three-dimensional mesh.

To achieve the objects, according to the present invention, there is provided a three-dimensional skeleton generation method using calibration based on a joint acquired from a multiview camera, the three-dimensional skeleton generation method including: (a) acquiring a multiview color-depth video; (b) generating a three-dimensional skeleton of each viewpoint from a color-depth video of each viewpoint, and generating a joint of the skeleton of each viewpoint as a feature point; (c) performing extrinsic calibration for optimizing an extrinsic parameter by using the joint of the skeleton of each viewpoint; and (d) aligning and integrating the three-dimensional skeleton of each viewpoint by using the extrinsic parameter.

In addition, in the three-dimensional skeleton generation method using the calibration based on the joint acquired from the multiview camera according to the present invention, in the step (a), the multiview color-depth video may include a color-depth video of each viewpoint taken by at least four color-depth cameras in each layer of at least two horizontal layers.

In addition, in the three-dimensional skeleton generation method using the calibration based on the joint acquired from the multiview camera according to the present invention, in the step (b), the three-dimensional skeleton may be extracted for each camera by using a software development kit (SDK) of Azure Kinect.

In addition, in the three-dimensional skeleton generation method using the calibration based on the joint acquired from the multiview camera according to the present invention, the step (c) may include configuring the joint of the skeleton of each viewpoint as a feature point set, detecting a feature point having a maximum error by optimizing the extrinsic parameter with respect to the feature point set, excluding the detected feature point from the feature point set and repeatedly performing the optimization with respect to a remaining set, and acquiring the optimized extrinsic parameter in a case where an optimization error is minimum as a final extrinsic parameter.

In addition, in the three-dimensional skeleton generation method using the calibration based on the joint acquired from the multiview camera according to the present invention, the step (c) may include stopping the repetition, and selecting a camera parameter upon the stopping as the final parameter, when an error of a joint having a maximum error is less than or equal to a predetermined threshold.

In addition, in the three-dimensional skeleton generation method using the calibration based on the joint acquired from the multiview camera according to the present invention, the step (c) may include optimizing a transformation parameter such that an error between an actual coordinate $(X_{ref})$ of a point cloud of a reference coordinate system and a transformation coordinate $(X_i')$ by a transformation parameter is minimized, in which the optimization is repeatedly performed by updating a next coordinate transformation parameter $P_{n+1}$ from a current coordinate transformation parameter $P_n$ by Formula 1:

$$P_{n+1} = P_n - \alpha \frac{\partial f_{Error}}{\partial P_n},$$

where α is a preset constant, P is a transformation parameter, R is a rotation transformation matrix, t is a translation matrix, S is a scaling factor, $P_n$ is a value of a transformation parameter that is currently calculated, $P_{n+1}$ is a value of a coordinate transformation parameter to be refined, $\partial f_{Error}/\partial P_n$ is a partial differentiation of $f_{Error}$ with respect to a transformation parameter, and $f_{Error}$ is an error function of an actual coordinate $(X_{ref})$ of a point cloud of a reference coordinate system and a transformation coordinate $(X_i')$ by a transformation parameter.

In addition, in the three-dimensional skeleton generation method using the calibration based on the joint acquired from the multiview camera according to the present invention, in the step (d), the three-dimensional skeleton of each viewpoint may be integrated after being aligned into one world coordinate system by using the extrinsic parameter or a camera parameter of each viewpoint.

In addition, in the three-dimensional skeleton generation method using the calibration based on the joint acquired from the multiview camera according to the present invention, the step (d) may include generating a three-dimensional mesh model from the multiview color-depth video, transforming and aligning the skeleton of each viewpoint into the world coordinate system and placing the aligned three-dimensional skeleton and a three-dimensional volumetric mesh model in one space, and refining the skeleton by excluding a joint existing outside the three-dimensional volumetric mesh model.

In addition, in the three-dimensional skeleton generation method using the calibration based on the joint acquired from the multiview camera according to the present invention, in the step (d), the three-dimensional volumetric model may be generated by using point cloud integration or mesh generation.

In addition, according to the present invention, there is provided a computer-readable recording medium recorded with a program for performing a three-dimensional skeleton generation method using calibration based on a joint acquired from a multiview camera.

As described above, according to the three-dimensional skeleton generation method using the calibration based on the joint acquired from the multiview camera of the present invention, the parameter may be calculated by using the joint of the partial skeleton of a multiview RGB-D video as the feature point, and the skeleton may be integrated based on the parameter, so that a three-dimensional skeleton with high reliability can be generated, and the generated three-dimensional skeleton can accurately express a shape and a movement of three-dimensional volumetric information without any temporal interruption.

BRIEF DESCRIPTION OF THE DRAWINGS

FIGS. 3A-3B are views illustrating an actual-image-based 3D volumetric photographing system according to one embodiment of the present invention, in which

FIGS. 4A-4C are views illustrating a video output from an RGB-D camera and a joint of a skeleton according to one embodiment of the present invention, in which

FIGS. 5A-5B are views illustrating extraction of a feature point from the skeleton according to one embodiment of the present invention, in which FIG. 5A illustrates the skeleton.

FIGS. 8A-8B are views schematically illustrating joint determination and refinement schemes using a point cloud distribution of an integrated three-dimensional model according to one embodiment of the present invention, in which a thick dotted line denotes a surface of a three-dimensional model, a square dot denotes a determined joint, a black dot denotes an aligned joint, FIG. 8A illustrates an aligned joint.

DETAILED DESCRIPTION OF THE INVENTION

Hereinafter, specific details for implementing the present invention will be described with reference to the drawings.

In addition, in describing the present invention, the same parts will be denoted by the same reference numerals, and redundant descriptions thereof will be omitted.

First, examples of a configuration of an entire system for implementing the present invention will be described with reference to FIG. 1.

Figure 1:
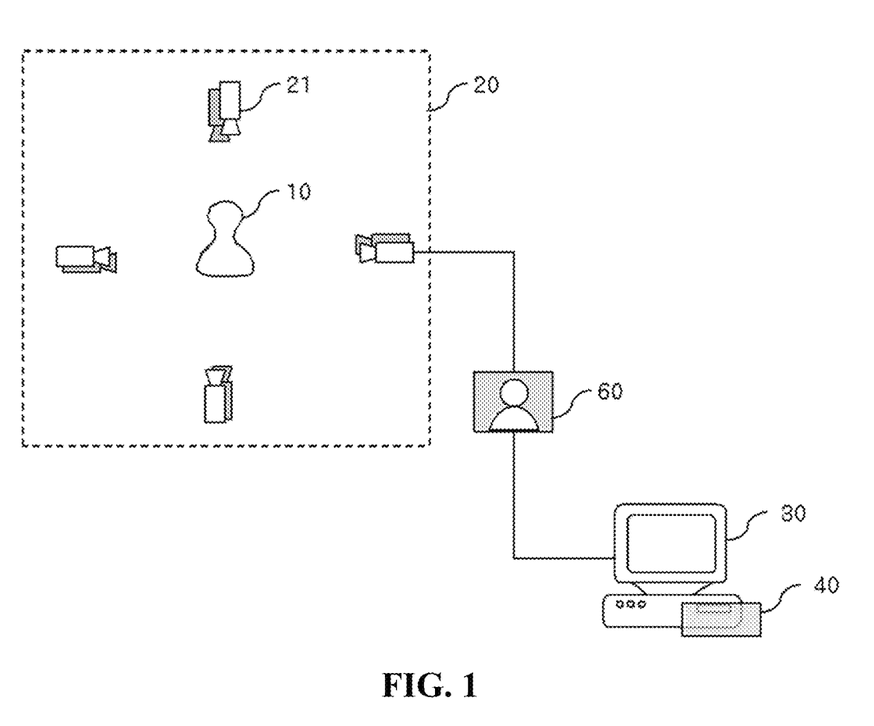
FIG. 1 is a view showing a configuration of an entire system for implementing the present invention.

As shown in FIG. 1, a three-dimensional skeleton generation method according to the present invention may be implemented as a program system on a computer terminal 30, which is configured to receive multiview depth and color (RGB, etc.) images 60 captured by a distributed camera system 20 to generate a three-dimensional skeleton. In other words, the three-dimensional skeleton generation method may be configured as a program so as to be installed and executed in the computer terminal 30. The program installed in the computer terminal 30 may operate as a single program system 40.

Meanwhile, as another embodiment, the three-dimensional skeleton generation method may be configured and implemented as a single electronic circuit such as an application-specific integrated circuit (ASIC) in addition to being configured as a program to operate on a general-purpose computer. Alternatively, the three-dimensional skeleton generation method may be developed as a dedicated computer terminal 30 for exclusively processing only an operation of generating a three-dimensional skeleton from multiview depth and color images. This will be referred to as a three-dimensional skeleton generation system 40. Other possible embodiments may also be implemented.

Meanwhile, the distributed camera system 20 may include a plurality of color-depth (RGB-D) cameras 21 for capturing an object 10 at different viewpoints.

In addition, each of the RGB-D cameras 21 may be a camera for acquiring color and depth videos (or an RGB-D video) by measuring color information and depth information. Preferably, the RGB-D camera 21 may be a Kinect camera. Through the RGB-D camera 21, the color and depth videos may include two-dimensional pixels, and each of the pixels may have a color value and a depth value.

The multiview color-depth video 60 captured by the RGB-D camera 21 may be directly input to and stored in the computer terminal 30, and may be processed by the three-dimensional skeleton generation system 40. Alternatively, the multiview color-depth video 60 may be pre-stored in a storage medium of the computer terminal 30, and the stored color-depth video 60 may be read and input by the three-dimensional skeleton generation system 40.

A video may include temporally consecutive frames. For example, when a frame at a current time t is referred to as a current frame, a frame at an immediately preceding time t−1 will be referred to as a previous frame, and a frame at t+1 will be referred to as a next frame. Meanwhile, each of the frames may have a color video (or a color image) and a depth video (or depth information).

In particular, the object 10 may be captured at different viewpoints corresponding to a number of the RGB-D cameras 21, and the multiview depth and color videos 60 corresponding to the number of the cameras may be acquired at a specific time t.

Meanwhile, the color-depth video 60 may include temporally consecutive frames. One frame may include one image. In addition, the video 60 may have one frame (or an image). In other words, the video 60 may be a single image.

Although matching of multiview cloud points in the multiview color-depth video means detection from each of depth/color frames (or images), the terms 'video' and 'image' will be interchangeably used unless it is necessary to particularly distinguish the terms from each other in the following description.

Next, an overall configuration of a three-dimensional skeleton generation method using calibration based on a joint acquired from a multiview camera according to one embodiment of the present invention will be described.

In general, a 3D volumetric modeling result may be widely used for generating contents for AR and VR services through precise movement recognition, rigging, or region segmentation. A 3D volume may be generated with distributed cameras having various shapes and characteristics.

The present invention relates to a method of acquiring a precise 3D skeleton in order to apply rigging or animating to a 3D volumetric mesh model by using a distributed RGB-D camera network capable of performing photographing at various viewpoints.

To this end, a novel graphics pipeline for acquiring a camera parameter by using an RGB-D camera network distributed at arbitrary locations in a space and generating one integrated three-dimensional skeleton may be configured.

The method according to the present invention may mainly include two or three processes.

A first process may be a modified parameter optimization process. In other words, the first process may be a process of acquiring a parameter of each camera by using three-dimensional skeleton information in a distributed camera network. The acquired parameter may be used to integrate the skeleton acquired for each camera.

In detail, the camera parameter may be calculated by using a joint of a partial skeleton acquired from the cameras as a feature point. Since a plurality of cameras may all be present at arbitrary locations, it is necessary to acquire the camera parameter for integration. According to the present invention, unlike a general scheme, intrinsic and extrinsic parameters among the cameras may not be calculated by using a specially designed compensation plate.

A second process may be a 3D skeleton generation process. The skeletons acquired from the cameras within the distributed camera network may be aligned by using the camera parameters.

In other words, one 3D skeleton may be generated by integrating the skeletons acquired from the cameras by using the calculated camera parameters, and simultaneously, a 3D volumetric model in the form of a registered point cloud may be reconstructed. That is, the partial skeleton acquired independently from each camera may be aligned in a 3D space by using the acquired camera parameters.

A third process may include an algorithm for refining each joint of the skeleton by using three-dimensional volumetric information. A 3D volumetric model in the form of a point cloud or a mesh may be generated by using the camera parameters, a depth map, and an RGB video, which are generated from the distributed camera network. An integrated 3D skeleton may be generated by refining the three-dimensional skeleton by using the three-dimensional volumetric model.

The refinement may be performed both spatially and temporally. The 3D point cloud may be used to integrate point cloud information acquired by using the RGB-D cameras and refine a position of the joint, so that a 3D skeleton with high reliability may be generated. In particular, the 3D volumetric model may be generated, 3D skeleton information aligned by using the 3D volumetric model may be integrated, and finally, a high-quality 3D skeleton may be generated.

The generated 3D skeleton may accurately express a shape and a movement of 3D volumetric information without any temporal interruption.

The distributed camera network has been generally used to acquire a 3D volume. As described above, the 3D volume may be generated by using the multiview video acquired from the distributed camera network in various ways. Since the distributed camera network is distributed at arbitrary locations, all or a portion of the object may be included in the video acquired from each camera according to a size or a location of the object. In the worst case, all the cameras may capture only a portion of the object. When a 3D skeleton for a 3D volume is acquired in such an environment, one 3D skeleton has to be acquired by integrating such information from all the cameras.

Next, the three-dimensional skeleton generation method using the calibration based on the joint acquired from the multiview camera according to one embodiment of the present invention will be described in more detail with reference to FIG. 2.

Figure 2:
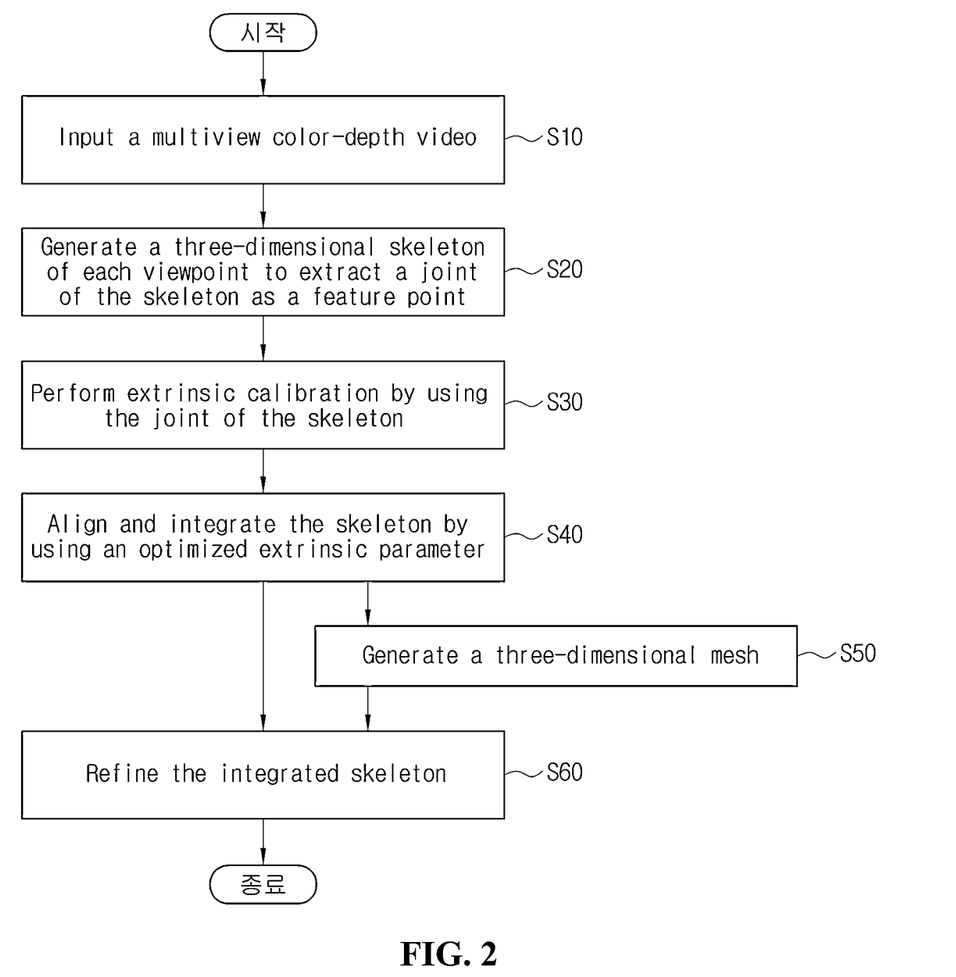
FIG. 2 is a flowchart for describing a three-dimensional skeleton generation method using calibration based on a joint acquired from a multiview camera according to one embodiment of the present invention.

As shown in FIG. 2, the three-dimensional skeleton generation method according to one embodiment of the present invention may include (a) a multiview color-depth video acquisition step S10, (b) a joint-based feature point generation step S20, (c) a skeleton-based extrinsic calibration step (skeleton-based dynamic extrinsic calibration step) S30, (d) a skeleton alignment and integration step S40, and (f) a skeleton refinement step S60. In addition, the three-dimensional skeleton generation method may further include (e) a three-dimensional mesh model generation step S50.

In other words, in a case of a distributed multiview camera, as the object moves, a region of the object that may be captured by each camera may vary. In this case, a method of generating one piece of information by collecting partial information captured by each camera may be required. Since the present disclosure aims to generate the 3D skeleton, a part of the skeleton for a part of the object captured at each location may be acquired (DL-based 3D skeleton generation), and the partial skeleton may be aligned (skeleton alignment) and integrated (skeleton integration), so that a complete 3D skeleton may be acquired. In addition, the camera parameters for the distributed cameras may be required to align the skeleton, and an accurate 3D skeleton may be embedded in the 3D volumetric model by refining the skeleton by using 3D mesh information in a process of integrating the skeleton.

The three-dimensional skeleton generation method according to one embodiment of the present invention will be described in more detail below.

First, a multiview video acquired by capturing an object 10 may be received from a multiview color-depth (RGB-D) camera (S10). In other words, a multiview color-depth camera system may capture the object, and a multiview color-depth video acquired through the capturing may be received. In addition, a point cloud that follows a coordinate system of the depth camera may be acquired from each camera by using depth and RGB images captured by the RGB-D camera.

Figure 3A:
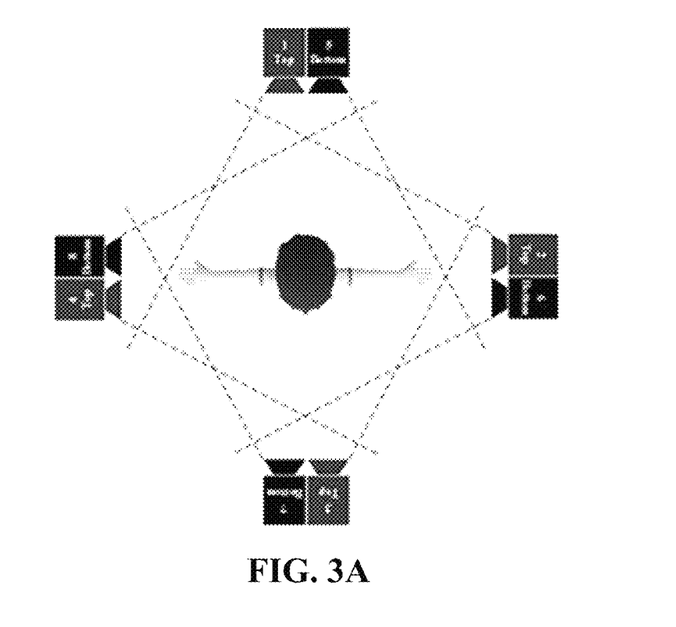
FIG. 3A illustrates a vertical photographing angle and a vertical photographing range.
Figure 3B:
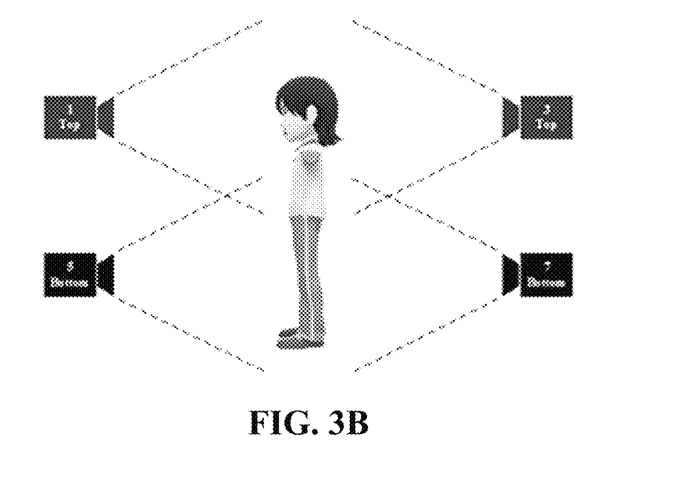
FIG. 3B illustrates a horizontal photographing angle and a horizontal photographing range.

The RGB-D camera may be used to generate an actual-image-based 3D volume. Since an objective is to generate the 3D skeleton, a plurality of RGB-D cameras may be distributively installed around the space. Preferably, an arrangement of the RGB-D cameras (eight RGB-D cameras, etc.) may be configured by using stand-type photographing equipment in which the cameras may be installed at different heights in order to capture the object from all heights. FIGS. 3A-3B show a distributed camera network used in the present invention.

The distributed camera network refers to a system in which a plurality of cameras are arranged at arbitrary locations in a predetermined space to scan an object. In particular, according to the distributed camera system 20, cameras facing an object may be installed at at least four points (viewpoints) in a horizontal direction, and at least two cameras may be installed at each of the points (viewpoints) while being spaced apart from each other in a vertical direction (an up-down direction). In other words, according to the distributed camera system 20, at least four cameras may constitute one horizontal layer, and at least two horizontal layers may be provided. It is unnecessary to install all the cameras at exact locations, and the cameras may be installed at approximately similar locations.

For example, as shown in FIGS. 3A-3B, eight RGB-D cameras may be installed. In other words, the eight cameras may face a center of the space, in which four cameras may be located on a lower side, and four cameras may be located on an upper side.

More preferably, a color-depth (RGB-D) sensor using Asure Kinect, which is a time-of-flight (ToF) sensor that is relatively inexpensive, may be used. However, any device or system capable of extracting a 3D skeleton as well as a software development kit (SDK) of Azure Kinect may be used.

Meanwhile, a plurality of RGB and depth map videos generated through the distributed RGB-D camera network may be refined through preprocessing.

Next, a three-dimensional skeleton of each viewpoint may be generated from a color-depth video of each viewpoint, and a joint of the skeleton of each viewpoint may be generated as a feature point (S20).

Preferably, the 3D skeleton may be generated based on DL. In other words, the skeleton may be extracted by using deep learning such as OpenPose.

In particular, the 3D skeleton may be extracted for each camera by using the SDK of Azure Kinect. Any conventional scheme for extracting the 3D skeleton for each camera may be used, and different schemes may be used for each camera.

Figure 4A:
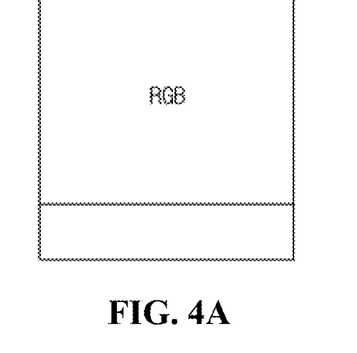
FIG. 4A illustrates a color video (RGB image)
Figure 4B:
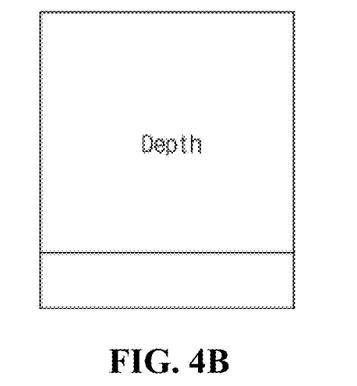
FIG. 4B illustrates a depth video (depth image)
Figure 4C:
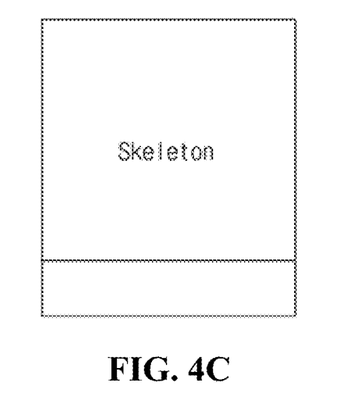
FIG. 4C illustrates an estimated skeleton and a defined joint.

An example of extracting a skeleton from a color-depth video is shown in FIGS. 4A-4C.

For example, a two-dimensional (2D) skeleton may be extracted by using OpenPose adopting a neural network scheme (see Non-Patent Document 3). OpenPose is a library that is based on a convolutional neural network (CNN) and capable of extracting features of bodies, hands, and faces of multiple persons from a photograph in real time. In particular, OpenPose may rapidly detect poses of multiple persons. OpenPose is a sort of a bottom-up scheme in which performance has been improved without repetitive processing. The bottom-up scheme is a scheme of estimating joints of all persons, connecting positions of the joints, and performing regeneration with the corresponding joint positions of the persons. A result of extracting the skeleton by using OpenPose may be output as an image and a json file.

Figure 5A:
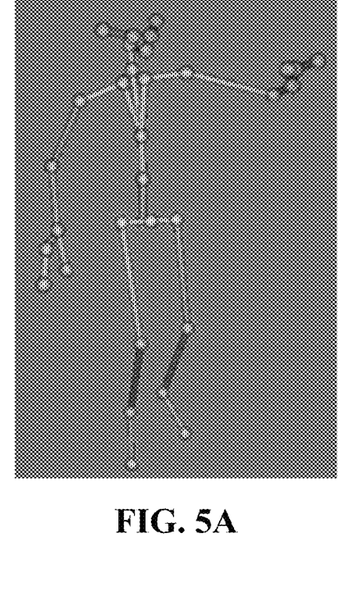
Figure 5B:
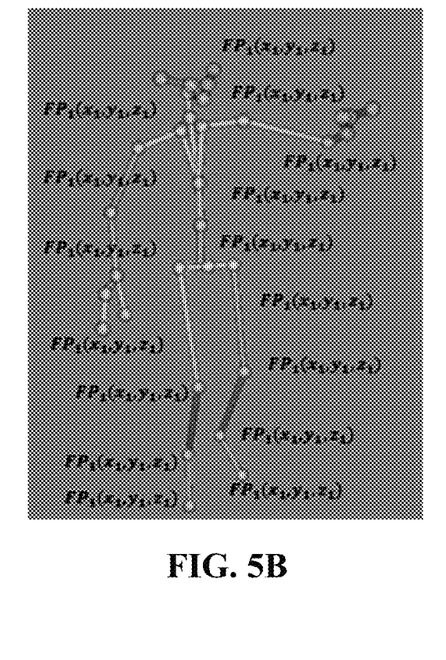
FIG. 5B illustrates the feature point defined as the joint.

In addition, the joints may be generated as feature points of each viewpoint in the extracted three-dimensional skeleton. An example of generating the joint of the skeleton as the feature point is shown in FIGS. 5A-5B.

Next, extrinsic calibration for optimizing an extrinsic parameter may be performed by using the joint of the skeleton of each viewpoint (S30).

Figure 6:
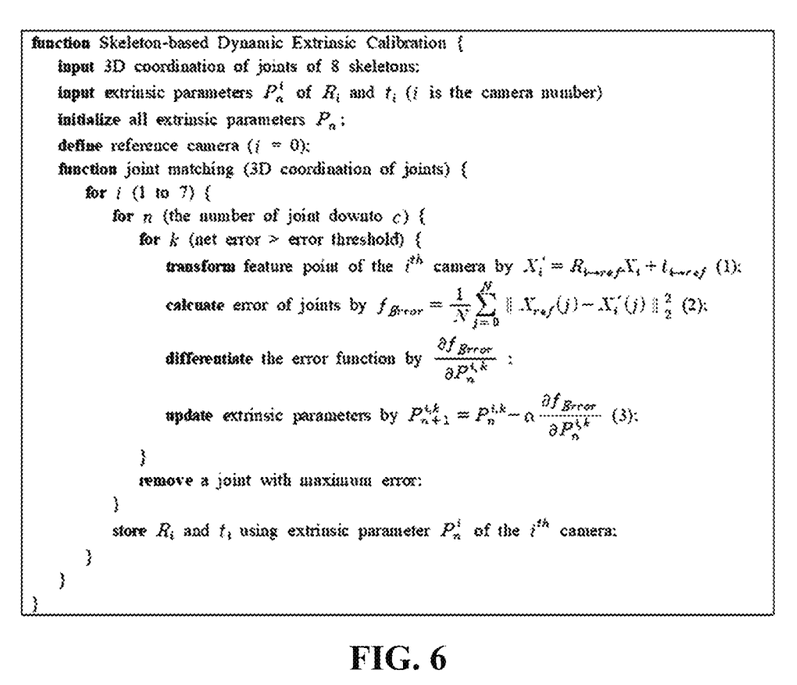
FIG. 6 shows a pseudocode showing a skeleton-based extrinsic calibration scheme according to one embodiment of the present invention.
Figure 7A:
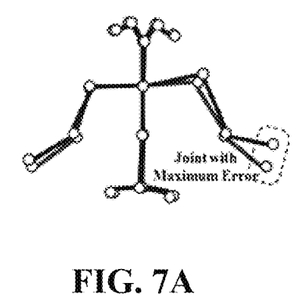
FIGS. 7A-7F are views schematically showing extrinsic parameter optimization steps in which a distance between joints in a space is used to minimize a difference in the distance according to one embodiment of the present invention.
Figure 7B:
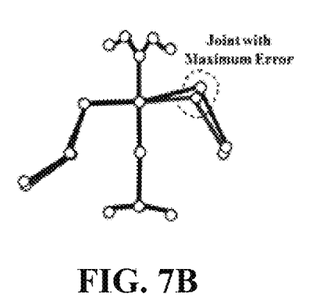
Figure 7C:
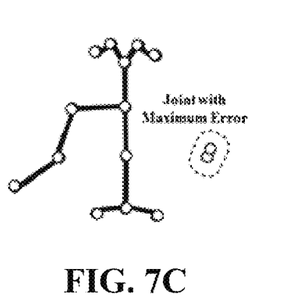
Figure 7D:
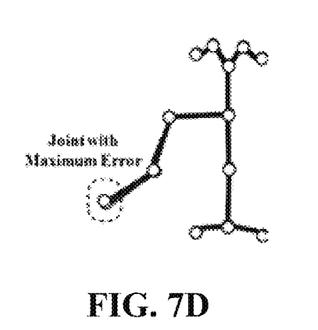
Figure 7E:
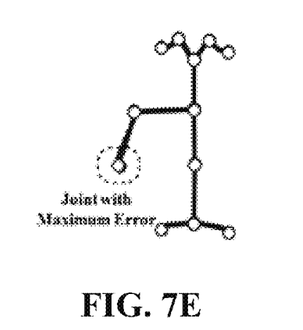
Figure 7F:
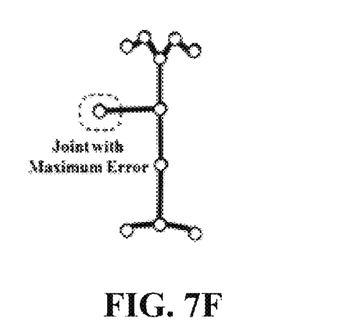

FIG. 6 shows a pseudocode showing an extrinsic calibration process for acquiring a camera parameter by using a skeleton, and FIGS. 7A-7F schematically shows the extrinsic calibration process.

As shown in FIG. 6 or FIGS. 7A-7F, the joint of the skeleton of each viewpoint may be configured as a feature point set. In addition, a feature point having a maximum error may be detected by optimizing the extrinsic parameter with respect to the feature point set, the detected feature point may be excluded from the feature point set, and the optimization may be repeatedly performed with respect to the remaining set. In this case, the repetition may be performed until a size of the feature point set is 1. In addition, the optimized extrinsic parameter in a case where an optimization error is minimum may be acquired as a final extrinsic parameter.

In detail, primary optimization may be performed by using effective joint information acquired from each camera as a feature point. Next, optimization may be performed again by excluding the joint having the maximum error after the previous optimization, and an error for all joints may be recalculated and stored. The above process may be repeatedly performed until a difference between a converged value of an optimization error of a previous joint set and a converged value of an optimization error of a next joint set is less than or equal to a predetermined threshold. In other words, the repetition may be stopped when the difference is less than or equal to the predetermined threshold. In addition, the repetition may be stopped, and a camera parameter acquired by the current optimization upon the stopping may be acquired. This process may be repeatedly performed by using information about eight skeletons acquired from all the cameras.

Next, a process of optimizing an extrinsic parameter with respect to a feature point set will be described below. In other words, a scheme of acquiring an extrinsic parameter of each camera by using a coordinate matched from point cloud sets (or feature point sets) for the calibration may be as follows.

The above parameters may be calculated by using an optimization algorithm so that a Euclidean square distance of coordinates matched to the parameters may be minimized. A transformation matrix of a coordinate system may include parameters for rotation angles and translation values for each of x, y, and z-axes. After one camera is set as a reference coordinate system, parameters for transforming coordinate systems of other cameras with the reference coordinate system may be obtained. $X_{ref}$ may represent a reference camera coordinate, and $X_i$ may represent a remaining camera coordinate. $R_{i->ref}$ and $t_{i->ref}$ may represent rotation and translation matrices from each camera to a reference camera. Initially, R may be a unit matrix, and $t_{i->ref}$ may be all zeros.

In Formula (1) of FIG. 6, when an initial parameter is applied, a result may be $X_i$, which may converge to $X_{ref}$ as the optimization is performed. A loss function to which the optimization is performed may be an average value of a squared Euclidean distance (SED) of $X_{ref}$ and $X_i'$. Formula (2) may represent an error function.

A process of differentiating the loss function with respect to transformation parameters of the coordinate system and updating the parameters so that the function may be minimized may be expressed by Formula (3). α may be a learning rate that is a constant, and a value of 0.01 may be preferably used as a predetermined constant value. P may represent a camera parameter or an extrinsic parameter, and $P_{n+1}$ and $P_n$ may be parameters in $(n+1)^{th}$ and $n^{th}$ repetitive operations, respectively.

According to an experiment, if the above process is performed 200,000 times or more, an average error of eight cameras may be decreased to 2.98 mm.

Next, the three-dimensional skeleton of each viewpoint may be aligned and integrated by using the extrinsic parameter (S40).

In other words, the three-dimensional skeleton of each viewpoint may be integrated after being aligned into one world coordinate system by using the extrinsic parameter or the camera parameter of each viewpoint, which is previously obtained. According to the previous example, since eight cameras are used, a maximum of eight partial skeletons may be aligned and integrated into one world coordinate system.

In detail, when the parameter of each camera is obtained by the optimization process, transformation from a camera coordinate system at each viewpoint to a world coordinate system may be performed by using Mathematical formula 4 as follows, and point clouds may be aligned based on a unified coordinate system.

Translation and rotation transformation parameters for a skeleton position to align a skeleton may be calculated by using eight pairs of color (RGB) and depth videos acquired from the distributed camera network. The translation and rotation transformation parameters may be the transformation parameter (camera parameter) of each viewpoint acquired in the previous process of optimizing the extrinsic parameter.

When rotation (R) and translation (t) matrices for each camera optimized by using a function optimization scheme are applied to the 3D skeleton extracted from each camera defined based on each camera coordinate system, all the 3D skeletons may be aligned with respect to the world coordinate system.

Such a relation may be defined as Mathematical formulas 4 and 5. $P_W$ may represent a world coordinate (reference camera coordinate), and $S_C$ may represent a camera coordinate [18].

$$S_C = R \times P_W + t \qquad \text{[Mathematical formula 4]}$$

$$P_W = R^{-1} \times (S_C - t) \qquad \text{[Mathematical formula 5]}$$

Next, a three-dimensional mesh model may be generated from the multiview color-depth video (S50).

In other words, in the previous step, the skeleton of each viewpoint may be aligned, and a three-dimensional volumetric model in the form of a point cloud or a mesh may be generated from the aligned skeleton. In this case, a truncated signed distance function (TSDF) may be used, but the present invention is not limited thereto. That is, any scheme capable of recognizing a spatial distribution of an integrated point cloud may be applied.

Next, the integrated three-dimensional skeleton may be refined (S60).

Partial and incomplete three-dimensional skeletons acquired through the distributed cameras may be merged into one skeleton through a skeleton integration process. In this process, a joint that is incorrectly extracted may be deleted, and remaining joint information may be by averaged in the space, so that a correct skeleton may be extracted.

Figure 8A:
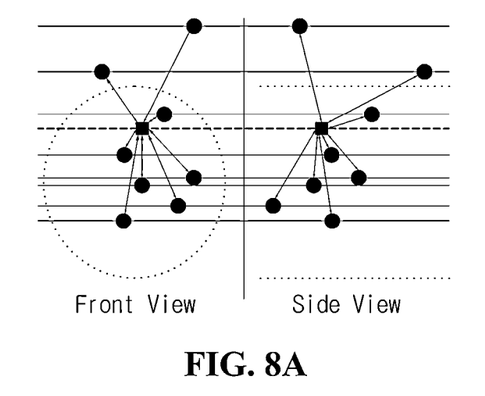
Figure 8B:
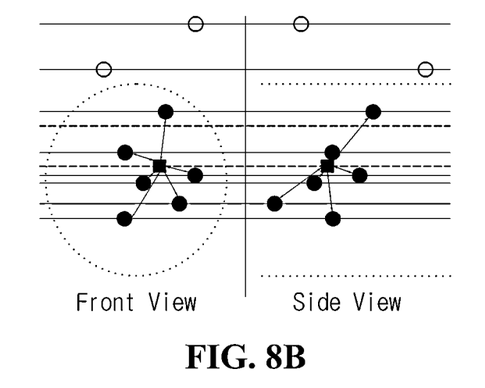
FIG. 8B illustrates a refined joint after excluding an unnecessary joint.

Preferably, as shown in FIGS. 8A-8B, three-dimensional volumetric mesh model information may be used to refine the integrated three-dimensional skeleton. In other words, the aligned 3D skeletons and the 3D volumetric mesh model may be arranged in one space, and joints existing outside the 3D volumetric mesh model may be considered as erroneously extracted joints so as to be deleted.

FIGS. 8A-8B illustrate refinement processes, in which FIG. 8A shows an aligned joint before refinement, and FIG. 8B shows a joint after the refinement. In particular, in FIGS. 8A-8B, a thick dotted line may represent a surface of a three-dimensional model, a red dot may represent a determined joint, and a blue dot may represent the aligned joint.

Meanwhile, the skeleton of each viewpoint may be transformed and aligned into the world coordinate system, and refined with the volumetric mesh, and a skeleton remaining after the refinement may be averaged and integrated.

Although the present invention invented by the present inventor has been described in detail with reference to the above embodiments, the present invention is not limited to the embodiments, and various modifications are possible without departing from the gist of the present invention.

What is claimed is:

1. A three-dimensional skeleton generation method using calibration based on a joint acquired from a plurality of cameras, the three-dimensional skeleton generation method comprising:
   (a) acquiring a multiview color-depth video of a plurality of viewpoints;
   (b) generating a three-dimensional skeleton of each viewpoint from a color-depth video of each viewpoint, and generating a joint of the skeleton of each viewpoint as a feature point;
   (c) performing extrinsic calibration for optimizing an extrinsic parameter by using the joint of the skeleton of each viewpoint; and
   (d) aligning and integrating the three-dimensional skeleton of each viewpoint by using the extrinsic parameter,
   wherein the step (c) includes optimizing a transformation parameter such that an error between an actual coordinate ($X_{ref}$) of a point cloud of a reference coordinate system and a transformation coordinate ($X_i'$) by the transformation parameter is minimized, in which the optimization is repeatedly performed by updating a next coordinate transformation parameter $P_{n+1}$ from a current coordinate transformation parameter $P_n$ by the following equation:

$$P_{n+1} = P_n - \alpha \frac{\partial f_{Error}}{\partial P_n},$$

where $\alpha$ is a preset constant, and $\partial f_{Error}/\partial P_n$ is a partial differentiation of $f_{Error}$ with respect to the transformation parameter, and $f_{Error}$ is an error function of the coordinate ($X_{ref}$) and the transformation coordinate ($X_i'$) by the transformation parameter.

2. The three-dimensional skeleton generation method of claim 1, wherein the plurality of cameras comprises at least four color-depth cameras, and wherein, in the step (a), the multiview color-depth video includes a color-depth video of each viewpoint taken by the at least four color-depth cameras in each layer of at least two horizontal layers.

3. The three-dimensional skeleton generation method of claim 1, wherein, in the step (b), the three-dimensional skeleton is extracted for each camera by using a software development kit.

4. The three-dimensional skeleton generation method of claim 1, wherein the step (c) includes configuring the joint of the skeleton of each viewpoint as a feature point set, detecting a feature point having a maximum error by optimizing the extrinsic parameter with respect to the feature point set, excluding the detected feature point from the feature point set and repeatedly performing the optimization with respect to a remaining set, and acquiring the optimized extrinsic parameter in a case where an optimization error is minimum as a final extrinsic parameter.

5. The three-dimensional skeleton generation method of claim 4, wherein the step (c) includes stopping the repetition, and selecting a camera parameter upon the stopping as the final parameter, when an error of a joint having a maximum error is less than or equal to a predetermined threshold.

6. The three-dimensional skeleton generation method of claim 1, wherein, in the step (d), the three-dimensional skeleton of each viewpoint is integrated after being aligned into one world coordinate system by using the extrinsic parameter or a camera parameter of each viewpoint.

7. The three-dimensional skeleton generation method of claim 6, wherein the step (d) includes generating a three-dimensional mesh model from the multiview color-depth video, transforming and aligning the skeleton of each viewpoint into the world coordinate system and placing the aligned three-dimensional skeleton and a three-dimensional volumetric mesh model in one space, and refining the skeleton by excluding a joint existing outside the three-dimensional volumetric mesh model.

8. The three-dimensional skeleton generation method of claim 7, wherein, in the step (d), the three-dimensional volumetric model is generated by using point cloud integration or mesh generation.

9. A non-transitory computer-readable recording medium recorded with a program for performing the three-dimensional skeleton generation method according to claim 1.

* * * * *